UNITED STATES PATENT OFFICE.

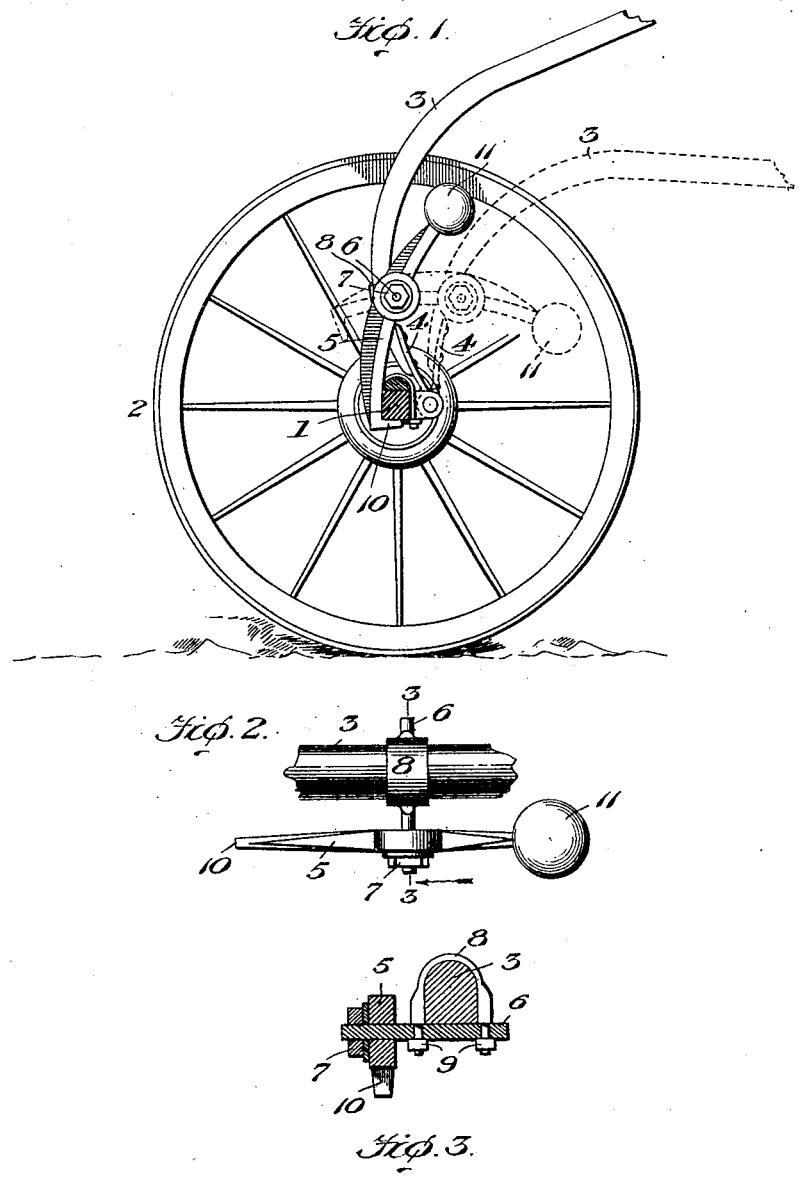

ALBERT WETZEL, OF EVANSVILLE, INDIANA.

AUTOMATIC VEHICLE-SHAFT HOLDER.

No. 913,247.  Specification of Letters Patent.  Patented Feb. 23, 1909.

Application filed September 5, 1908. Serial No. 451,786.

*To all whom it may concern:*

Be it known that I, ALBERT WETZEL, a citizen of the United States, residing at Evansville, county of Vanderburg, and State of Indiana, have invented certain new and useful Improvements in Automatic Vehicle-Shaft Holders, of which the following is a specification.

This invention relates to automatic vehicle shaft holders.

The present invention has for its object the provision of a simple and inexpensive attachment of novel construction which may be readily and easily applied to a buggy or other vehicle shaft and utilized when desired to secure the shafts in raised position, being at other times carried by the shaft out of the way of the horse or the vehicle if the latter is in use.

Having the foregoing object in view, the invention consists of an automatic shaft holder adapted to be carried by the shaft and made to engage the front axle of the vehicle when the shaft is raised and designed to automatically disengage itself from the axle by a slight manipulation of the shaft, as will more fully appear from the following specification, the novel features of the invention being set forth in the appended claim.

In the accompanying drawings:—Figure 1 is a view showing a vehicle wheel and shaft, the latter equipped with the holder, dotted lines representing the normal position of the parts and full lines showing the shaft head in raised position; Fig. 2, an enlarged detail plan of the holder and a portion of the shaft; and Fig. 3, a section on line 3—3, Fig. 2.

The front axle of a vehicle, such as a buggy, is shown at 1 and one of the wheels at 2, one of the shafts being shown at 3 as connected to the axle by the usual shaft or thill coupling 4.

The present invention is shown in detail in Figs. 2 and 3, and consists of an arm 5 loosely mounted on a rod 6 being held thereon by a nut 7, and a clip 8 whose ends pass through the rod 6 and are held by nuts 9. The arm 5 has a hook 10 at one end and a counter-balance weight 11 at its other end. It is obvious that the exact form of the hook 10 may be varied and that instead of a counter-balance weight 11, that end of the arm could be made heavier, or a spring substituted. The clip 8 embraces the upper part of the shaft 3, the rod 6 passing transversely thereunder, the nuts suitably holding the clip and rod to the shaft with the rod extending laterally so that the arm is loosely pivoted to swing in a vertical plane.

When the shaft is down or the vehicle in use, the arm hangs freely, as indicated by dotted lines in Fig. 1. When the shaft is raised sufficiently, a slight manipulation of the arm will cause the hook 10 to engage under the axle 1, as shown in Fig. 1, and the weight of the vehicle shaft will then keep the hook 10 in engagement with the axle and overcome the tendency of the counter-weighted end of the arm to fall. When the parts are thus engaged, the shaft will be held in elevated position. Upon slightly raising the shaft 3, the hook 10 automatically loosens from engagement with the axle 1 by virtue of the counterweighted end of the arm 5, so that the releasing action is entirely automatic upon slight lifting of the vehicle shaft.

Having thus described my invention, what I claim as new and desire to secure by Letters Patent, is:—

In a vehicle shaft holder, the combination with the vehicle shaft, of an arm pivoted intermediate its ends to the vehicle shaft and provided with a hook on one part to engage the vehicle axle and having the part on the other side of its fulcrum counterweighted so that the hook will be automatically disengaged from the axle upon manipulation of the vehicle shaft.

In testimony whereof, I hereunto affix my signature in presence of two witnesses.

ALBERT WETZEL.

Witnesses:
WILLIAM M. SMITH,
PRICILLA IMMELE.